Dec. 8, 1959   L. E. HOYER ET AL   2,915,860
JOURNAL BEARING LUBRICATORS
Filed Oct. 1, 1956   4 Sheets-Sheet 2
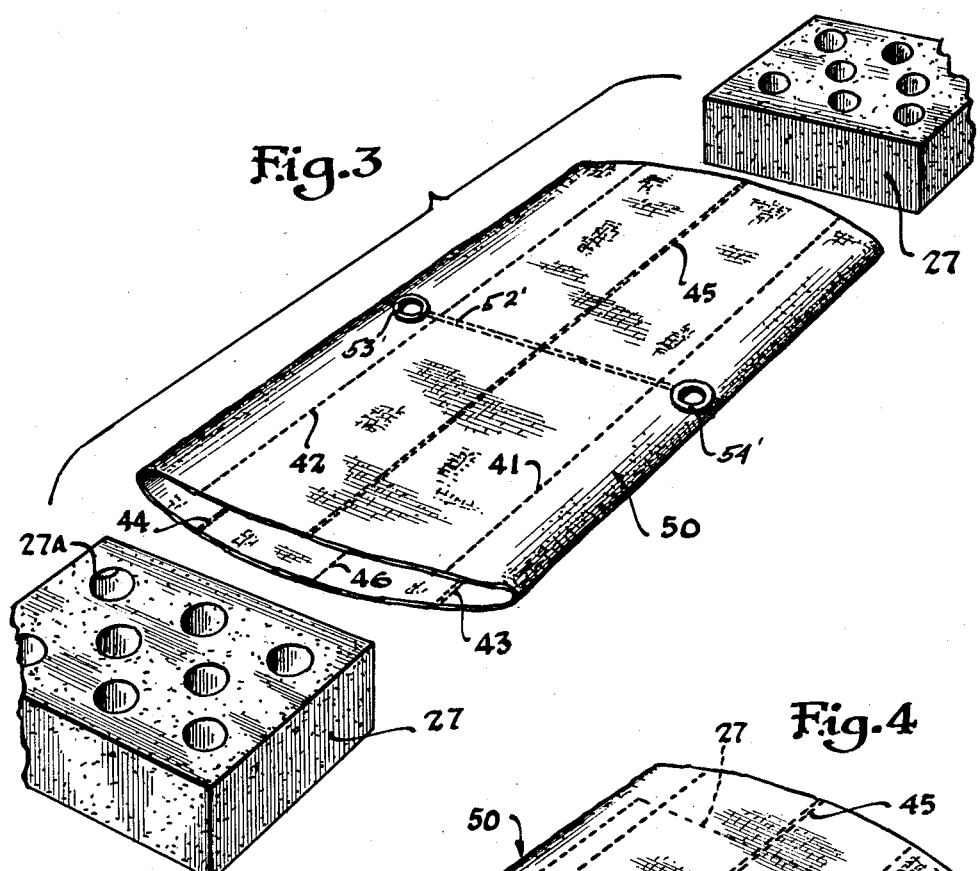
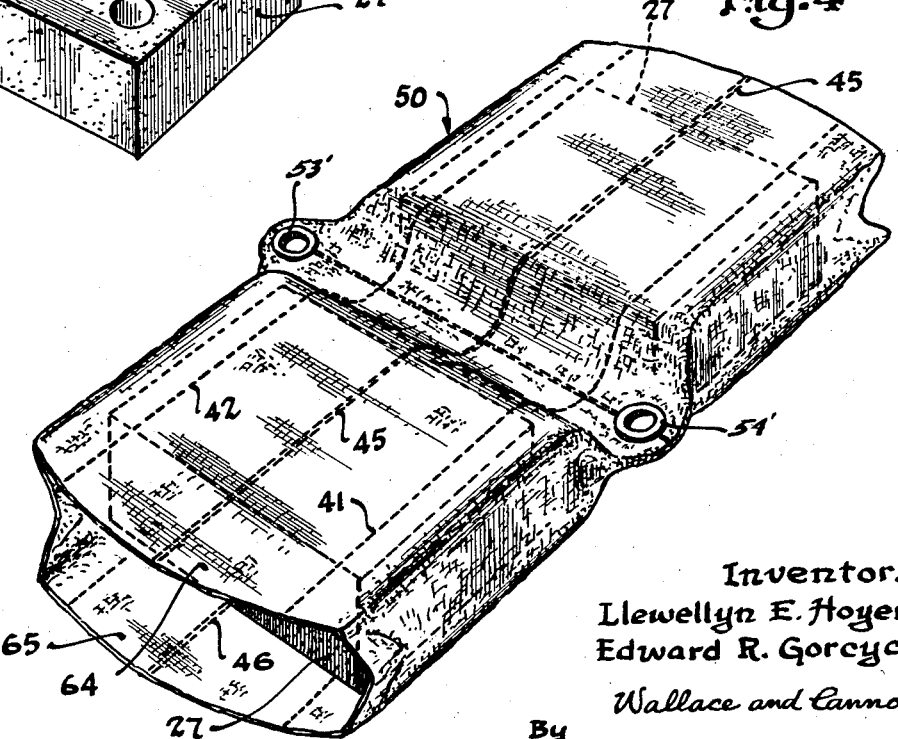
Inventors
Llewellyn E. Hoyer
Edward R. Gorcyca
By Wallace and Cannon
Attorneys

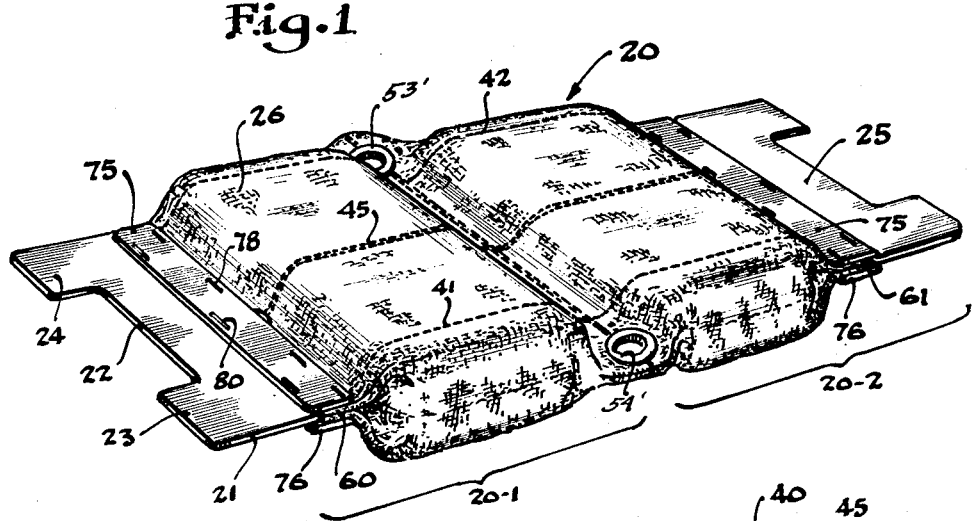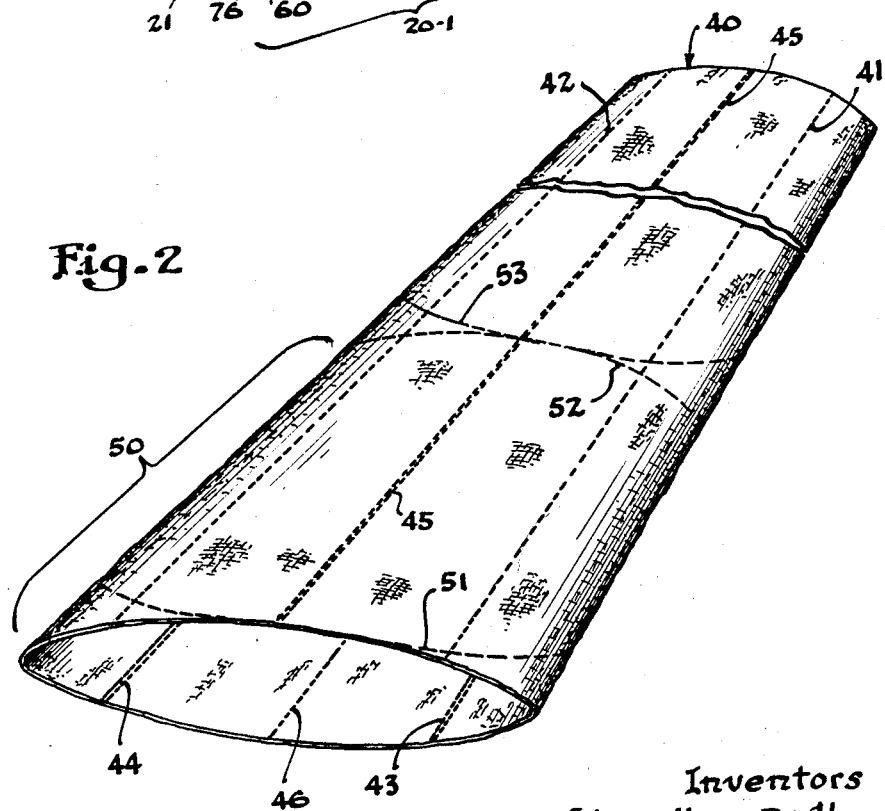

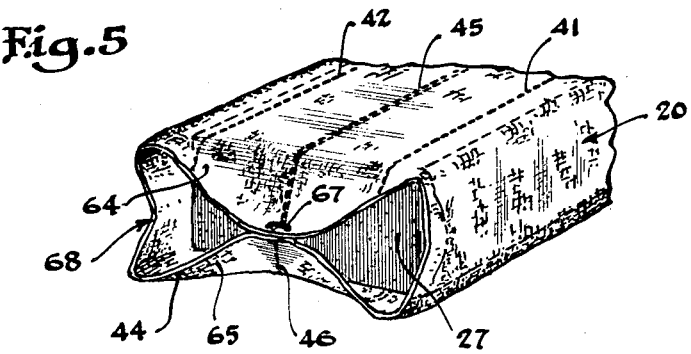
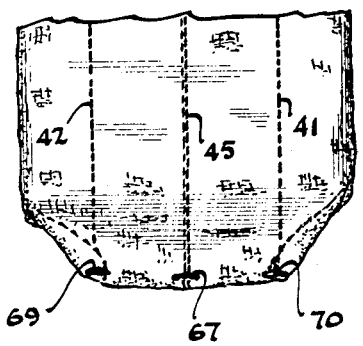
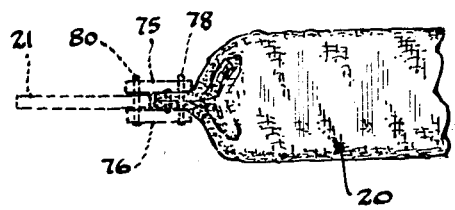
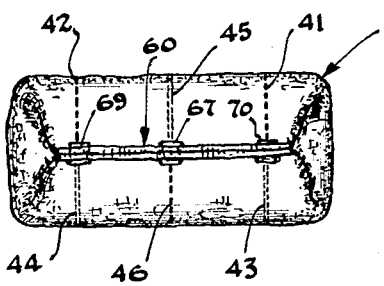

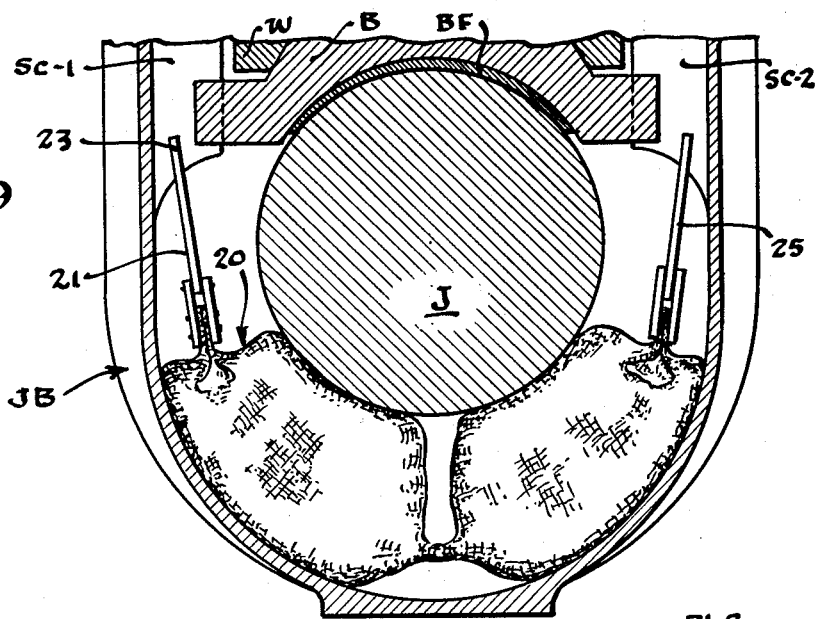
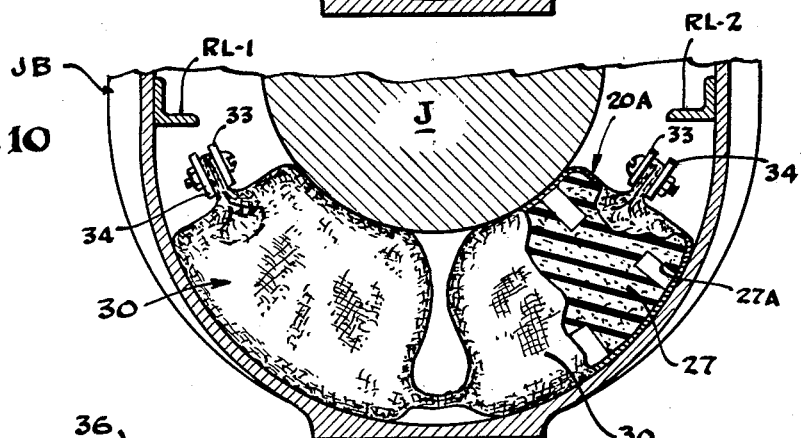
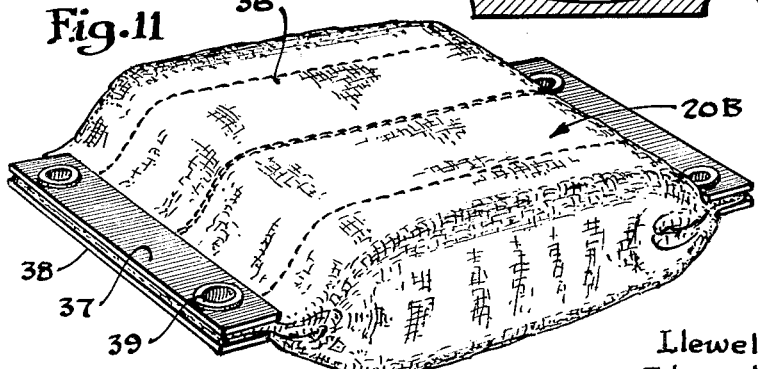

United States Patent Office 2,915,860
Patented Dec. 8, 1959

2,915,860

JOURNAL BEARING LUBRICATORS

Llewellyn E. Hoyer, Wyckoff, and Edward R. Gorcyca, Mahwah, N.J., assignors to American Brake Shoe Company, New York, N.Y., a corporation of Delaware Application October 1, 1956, Serial No. 613,176

8 Claims. (Cl. 53—29)

This invention relates to a lubricator and more particularly to a lubricator for a rotating journal and method of production thereof.

In application Serial No. 582,030 filed May 1, 1956 there is disclosed a lubricator for a railway journal bearing including a porous oil absorbent pad or core of sponge rubber or the like that is encased in a woven cover of wicking material. This particular kind of lubricator is so embodied as to be inserted in a journal box such as that on a railway car using a segmental bearing for the journal, and arranged in position between the bottom of the journal box and the journal. As is well known, lubricant is retained in the bottom of the journal box of a railway car having a segmental bearing, and the lubricator of the aforesaid application is adapted to relay such lubricant on to the journal.

The aforesaid lubricator has characteristics that are particularly important to proper lubrication of segmental bearings of a railway car, and enables packing of a railway journal box with oil soaked waste material to be dispensed with as representing what is commonly considered a major contributing factor to hot boxes. Moreover, this lubricator is capable of satisfactory operation under extremely variant temperature conditions; the cover has a particularly advantageous weave which contributes to enhanced feeding of oil on to the journal; and end portions of the cover are adapted to be stiffened so as to cooperate with fixed parts within the journal box to prevent in a positive manner any tendency for the lubricator to roll or be pushed to one side of the journal box.

As was mentioned above, the lubricator embodies a core of resilient material surrounded by a cover of wicking material, and as is described in the aforesaid application the cover is in the form of a sleeve in which the resilient core or pad is to be inserted with an end portion of the sleeve-like cover projecting beyond the related end of the resilient core. The projecting ends of the cover are drawn together and are stiffened to afford relatively rigid end panels or flaps on the lubricator that are adapted to cooperate with standard, fixed parts within the journal box so as to hold the lubricator against movement within the journal box. Because of relatively high speeds attained by railway cars and the rather severe motion of the journal boxes that are commonly encountered, it is extremely important that such a lubricator be accurately formed, oriented and dimensioned in order to prevent possible jamming of the lubricator within the journal box at times when the car is in motion, and the primary object of the present invention is to enable such accuracy to be accomplished. Thus, as was mentioned above, end portions of the cover of the lubricator that project beyond the core are drawn together incidental to the formation of an end flap, and specifically it is an object of the present invention to provide on opposite sides of the cover indicia which are at the centers of the opposite faces or sides of the cover, so that by aligning or registering these indicia incidental to formation of an end flap of the lubricator cover, assurance will be had that the cover will be symmetrically oriented with respect to a core within the cover, and that the end flaps of the cover will be of substantially the same dimension.

Another object of the present invention is to draw together and then fasten opposite sides of the sleeve or cover at each end portion thereof using medial indicia on the sleeve as a guide, and this represents the first step in forming an end flap on the cover of the lubricator. The next step is to tuck in reentrantly the corners of the lubricator cover or sleeve at an end thereof to define further the end flap and then to stiffen the flap. It is again important that this be an accurate orientation so that the respective end flaps at the opposite ends of the cover will be of uniform dimension, and another object of the present invention is to provide the cover with marginal indicia inwardly of the side edges of the cover on both sides or faces thereof which define the extent to which the corner portions of the cover are to be inwardly folded in the foregoing manner.

A further specific object of the present invention is to define the medial and the marginal indicia on the cover by warp threads of distinctive color woven in the cover, and since it is often at times desirable to know whether or not a lubricator of the aforesaid nature has been withdrawn from the journal box and inverted in the box a further specific object of the present invention is to have the centering indicia of contrasting color on the opposite sides of the cover. When the lubricator is initially installed, a record can be made of the disposition of the indicia, and if at a later time upon inspection of the journal box it is found the indicia are reversed it is then known that the lubricator prior to inspection has been reversed in the journal box for some reason or other.

Other and further objects of the present invention will be apparent from the following description and claims and are illustrated in the accompanying drawings, which by way of illustration, show preferred embodiments of the present invention and the principles thereof and what we now consider to be the best mode in which we have contemplated applying that principle. Other embodiments of the invention embodying the same or equivalent principles may be used and structural changes may be made as desired by those skilled in the art without departing from the present invention and the purview of the appended claims.

In the drawings:

Fig. 1 is a perspective view of a lubricator constructed in accordance with the present invention;

Fig. 2 is a view of the woven material for the cover of the lubricator as this material comes off the loom;

Fig. 3 is a view illustrating the final form of a lubricator cover just prior to insertion of a pair of resilient cores therein incidental to completion of the lubricator shown in Fig. 1;

Fig. 4 is a perspective view showing the cores inserted in the sleeve of Fig. 3 and prior to the formation of end flaps;

Fig. 5 is a fragmetary end perspective view of a portion of the assembly shown in Fig. 4 but with the cover material at one end of the lubricator having been drawn together and fastened by a fastener centered on the medial indicia of the cover incidental to formation of an end flap;

Fig. 6 is a top plan view of the portion of the lubricator shown in Fig. 5 and illustrating the tucking-in operation and the securing of the tucks and the flap;

Fig. 7 is an end view taken on Fig. 6;

Fig. 8 is a side elevation of the portion of the lubricator shown in Fig. 6, but further illustrating stiffening of the corresponding end flap;

Fig. 9 is a partial sectional view of a railway journal box showing the lubricator of Fig. 1 installed in operative position;

Fig. 10 is a partial sectional view of a railway journal box showing a modified form of lubricator installed in operative position; and Fig. 11 is a perspective view of still another form of lubricator contemplated by the present invention.

Referring to Figs. 1 and 9, there is shown a lubricator 20 of the kind contemplated by the present invention in a form that is particularly adapted for use in a railway journal box JB, Fig. 9. The lubricator 20 is arranged in the bottom of the journal box so that the upper face thereof engages the lower periphery of the journal J of the car axle, and the upper periphery of the journal J is adapted to rotate in engagement with the bearing face BF of a segmental bearing B of standard form mounted in the journal box. As is well known in the art, a wedge including a portion W, Fig. 9, is disposed in the top of the journal box to wedge the bearing tightly in place between the top of the journal box and the journal J. In the form of journal box shown in Fig. 9, a so-called stop column SC–1 is formed on the inner wall of the journal box at one side, and a like stop column SC–2 is provided on the opposite side of the journal box. As will be described in more detail herein below, the lubricator 20 includes a relatively stiff retainer plate 21 of fiberboard or the like extending outwardly at one end thereof, and this plate is provided with a cut-out portion 22, Fig. 1, affording ears 23 and 24 that are adapted to embrace the stop column SC–1, Fig. 9. A like retainer plate 25 adapted to engage stop column SC–2 is provided on the opposite end of the lubricator 20 as shown in Fig. 1. The arrangement of retainer plates 21 and 25 is described in detail in the aforesaid application as adapted to prevent shifting of the lubricator within the journal box. The lubricator 20, and those of modified form to be described below, includes a one-piece cover 26 of woven wicking material which is extended about a porous, oil-absorbent core as 27, Fig. 3, and the plates 21 and 25 are secured to projecting free end portions of the cover 26.

In Fig. 10, there is shown a lubricator 20A of modified construction, and in this instance the lubricator at each projecting free end of the cover 30 is stiffened as by a pair of plates 33 and 34 which when the lubricator 20A is installed in the journal box are disposed beneath a related retainer lug as RL–1 or RL–2 each in the form of an angle plate welded to the inner wall of the journal box JB. As will be appreciated from Figs. 1 and 9, the lubricators 20 and 20A each embody a pair of related identical sections as 20–1 and 20–2, Fig. 1, but there are circumstances where a lubricator contemplated by the present invention may consist of but one core or resilient pad within a cover, and a lubricator of this kind that is within the purview of the present invention is shown at 20B, Fig. 11, as including a cover 36 of woven wicking material enclosing a core (not shown in Fig. 11) of porous, resilient oil absorbent material, and rigid plates 37 and 38 of fiber board or the like used to stiffen projecting free end portions of the cover 36 that define an end flap. The plates 37 and 38 of the lubricator 20B are fastened to such end flaps of the cover 36 by brass grommets 39 that are illustrative of one form of fastener. In this connection, it will be noted that the plates 33 and 34 of the lubricator 20A used to stiffen the projecting free end portion or flap of the cover 30 shown in Fig. 10 are fastened to one another and the projecting free end portion of the cover 30 by nuts and bolts. The way in which the plates 21 and 25 associated with the lubricator 20 are fastened in place will be described below.

The present invention is concerned with production of lubricators of the foregoing kind that embody one or more porous, resilient cores inserted within a cover of woven wicking material as will now be described primarily in connection with the lubricator 20.

The lubricators of Figs. 1, 10 and 11 each include a woven cover of wicking material preferably embodying the weave described in detail in the aforesaid application, and this material as it comes off the loom is in the form of an elongated tube 40 shown in Fig. 2. The woven tube 40 in appearance is similar to heavy, white duck material, and in the course of weaving the tube 40 resort is had to a pair of distinctively colored warp threads 41 and 42 such as blue warp threads, and these warp threads are provided on the upper side or face of the tube 40 as viewed in Fig. 2 and are spaced inwardly of the longitudinal edges of the tube 40 substantially the same distance. Likewise, the lower side of the tube 40 is woven to include a pair of distinctively colored warp threads 43 and 44 which are parallel to the warps 41 and 42 and which are spaced inwardly of the longitudinal edges of the tube 40 the same distance as the warps 41 and 42. In other words, as tube 40 comes off the loom in a flat or collapsed state, the warps 41 and 43 register accurately at one margin of the tube 40 and the warps 42 and 44 likewise register accurately at the opposite margin. For reasons to be pointed out herein below, the warps 43 and 44 are of a color different from the warps 41 and 42, and advantageously the warps 43 and 44 can be red warps. Additionally, the tube 40 is woven with a center or medial warp 45 of distinctive color on the upper side thereof, and this warp is centered between the warps 41 and 42. In like manner, the lower side of the tube 40 is woven to include a distinctively colored warp 46, and when the tube is flattened the warp 46 registers accurately with the opposed warp 45. Advantageously, the warp 45 may be red and the warp 46 blue. Referring to Fig. 1, it will be observed that the warps 41, 42 and 45 appear on the upper side of the lubricator 20.

As the tube 40 is unreeled from the loom, sections in the form of sleeves of predetermined length are cut therefrom, and one such sleeve section 50 is shown in Fig. 2 as a tube to be used in forming the cover 26 for the lubricator 20. Preferably, in cutting sleeve sections as 50 from the tube 40 the cuts are made along arcuate lines 51, 52 and 53, Fig. 2, and it will be observed that the longitudinal spacing between the cut lines 51 and 52 define the longitudinal dimension of the sleeve 50. The distinctively colored warps mentioned above of course will terminate at the arcuate ends of each such sleeve section as 50 and constitute centering and aligning indicia to facilitate assemblage of a lubricator as will be described.

In those instances where the lubricator is to embody identical sections as 20–1 and 20–2, Fig. 1, in order to more fully envelope the lower periphery of the journal J, Figs. 9 and 10, in contrast to the lubricator 20B, Fig. 11, it is necessary to provide a tight transverse division across the transverse center of a sleeve as 50 in its initial form. Thus, referring to Fig. 3, the next step in production of a dual lubricator of this nature is to form such transverse division, and this may be conveniently accomplished by a transverse fastener in the form of a stitch 52′. Moreover, it is advantageous to be able to quickly extract a lubricator of the kind contemplated by the present invention from the journal box or to orient the same accurately therein. To this end, the lubricators as 20 and 20A are provided with brass grommets 53′ and 54′, Fig. 3, centered on the transverse stitch 52 just inwardly of the longitudinal edges of the sleeve as 50. These grommets represent hook receiving elements adapted to be engaged by a conventional packing hook or the like. Referring to Fig. 11, the grommets 39 mentioned above serve the same purpose in addition to fastening the plates 37 and 38 on to the projecting free ends of the cover 36.

Subsequent to the formation of the transverse division in the sleeve 50 for the dual type lubricator mentioned above, the entailed pair of core members 27 are then inserted into the respective open ends of the sleeve 50 as will be apparent from Fig. 3. These cores are of oil resistant sponge rubber such as neoprene synthetic rubber or the like, and preferably the opposed upper and lower sides thereof are provided with enlarged openings 27A which, as shown in Fig. 10, extend but part way through the body of the core to afford dead ends within the core. This is so in order that the lubricator in operative position will actually pump oil at times when there is relative movement of the journal toward the bottom of the journal box. When this relative movement takes place, oil trapped in the openings or enlarged passages 27A adjacent the bottom of the journal box will be placed under pressure causing oil to emit as a spray or jet from the upper face of the core 27 through the cover and onto the journal. Where the cores 27 are of open cell material, the cells thereof, very substantially smaller than the passages 27A, account for the desired high pressure jet oil spray, but where closed cell material is used it is necessary to develop capillary passages, as by punctures, extending from the dead end of each passage 27A to the opposed face of the core 27

The dimensions of the cores 27 relative to the sleeve 50 is such that when the cores 27 have been inserted in the sleeve 50 from the opposite ends thereof, the outer ends of the cores 27 are inward of the open ends of the sleeve 50 as will be observed in Fig 4, and such relation defines free end portions of the sleeve 50 which provide end flaps 60 and 61, Fig. 1, on the cover of the lubricator as will now be described.

After the cores or resilient pads 27 have been arranged in the sleeve 50 as shown in Fig 4, the medial centering indicia 45 and 46 are then used as a guide in providing the cover end flaps as mentioned above. Thus, the sleeve 50 is aligned relative to a core 27 so that when free end portions 64 and 65, Figs. 4 and 5, of the sleeve 50 at an end thereof are brought together the medial indicia 45 and 46 register accurately to assure that the portions of the sleeve on either side of the indicia 45 and 46 are symmetrical. After this has been accomplished, the free end portions of the sleeve 50 at an end thereof are drawn down tightly over the outer end of the core 27, held together manually, and are fastened together as by a staple 67, Figs 5 and 6, centered on the indicia 45 and 46. This operation is of course repeated at each end of the sleeve 50 and maintains the cores 27 accurately in position within the sleeve 50 so that subsequent operations can be carried out with assurance that the cores 27 will not be displaced or misaligned.

The next step is to complete formation of each end flap as 60 and 61, and inasmuch as the manipulative steps are duplicated at each end of the sleeve 50 the operations entailed at one end thereof will be described. First, the open end of the sleeve 50 at one corner thereof is tucked in reentrantly at 68, Fig. 5, until the marginal indicia 42—44 are brought into reigstry, and the corner is then fastened as by a staple 69, Fig. 6, centered on the aligned marginal indicia 42—44. After the first corner of an end flap has thus been defined, the opposite corner at the free end of the sleeve 50 is defined in a similar manner, and a second staple 70 is fastened in place on the related marginal indicia 41—43 to complete the end flap as shown in Fig. 6. It will be recognized that the purpose of the arcuate ends for the sleeve 50 is to produce substantially rectangular end flaps, due of course to the vertical spacing that prevails between the free end portions 64 and 65 of the sleeve 50 (see Fig. 4) prior to formation of the end flaps.

In order that the lubricator will be capable of co-operating with fixed parts within the journal box to resist in a positive manner shifting of the lubricator beyond a predetermined amount, the end flaps formed in the manner described above are stiffened. Such stiffening of the end flaps constitutes the next step in the production of a lubricator, and referring to Figs. 1 and 7, a pair of elongated rectangular stiffeners in the form of rectangular fiberboard plates 75 and 76 are disposed on the opposite sides of each end flap 60 and 61 and are secured to one another and to the related end flap by inner staples 78. It will be observed in Fig. 7 that the outer edges of the plates 75 and 76 project outwardly of the end of the related end flap 60 or 61, and finally the retainer plate 21 or 25 is arranged in the space between the outer ends of the plates 75 and 76 and is fastened in place as by outer staples 80. This completes assemblage of the lubricator 20, and as was mentioned above the arrangement of the end plates 21 and 25 is such as to co-operate complementally with the stop columns SC-1 and SC-2, Fig. 9, within the journal box.

In production of a lubricator 20A, the same steps are followed as above except that in this instance stiffeners in the form of the fiberboard plates 33 and 34 are used alone. It will be appreciated that the specific form of the centering indicia as 41, 42 and 45, the transverse divider 52' and the plates used to stiffen the flaps on the sleeve as 50 as well as the fasteners merely represent preferred forms and that centering indicia, end flap stiffeners and fasteners of any preferred form may be used. Thus, there are instances where an impregnation of the end flaps on the sleeve or cover may be advantageously used to stiffen the end flaps for the desired purpose, and it will be readily apparent that the staples mentioned above in connection with Figs. 5 to 8 can be replaced by rivets, grommets, studs and like fasteners.

In connection with the lubricator 20B, Fig. 11, it will be recognized that in this instance the sleeve cut from a tube as 40 to constitute the cover of the lubricator will be of substantially shorter longitudinal dimension in comparison to the sleeve 50 described above inasmuch as there is but one resilient core or insertable pad used in this instance; but otherwise, the method of production described above involving alignment of the core relative to the cover and securement of the core within the cover by means of fasteners centered on centering indicia, as well as formation and securement of the end flaps at either end of the cover for the lubricator 20B, is the same as that described above in detail.

It will be seen from the foregoing that the present invention enables lubricators of the kind described to be produced with the core of the lubricator accurately centered and aligned with respect to a cover of wicking material, and the end flaps will be of uniform width, all as a consequence of centering indicia provided on the cover. Such accuracy of production assures that all portions of the lubricator are symmetrical, especially the stiffened end flaps of the cover, thereby accounting for uniformity of the lubricator relative to the journal to be lubricated.

Hence, while we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A method of producing a lubricator of the kind described which is to include a resilient core and a cover in the form of a one-piece circular-closed sleeve of wicking material about the core, and comprising the steps of, affording on opposite sides of the sleeve at least at the ends thereof marginal indicia spaced inwardly the same distance from the longitudinal edges of the sleeve, additionally affording on opposite sides of the sleeve at least at the ends thereof medial indicia accurately centered between the first-named indicia, opening one end of said sleeve and inserting therein such a resilient core with the corresponding end portion of said sleeve projecting outwardly of the related end of said core, initially bringing into registry at least the medial indicia on the opposite sides of said sleeve at said projecting end thereof, fastening the opposite sides of the sleeve at said projecting end with a fastener centered on the registered medial indicia, tucking in portions of said sleeve reentrantly at the corners of said projecting end to initiate formation of an end flap and to bring into final registry the marginal indicia at said end portion of the sleeve to produce an end flap for the sleeve, securing said tucks and flap by fasteners after such final registry, and then stiffening said flap.

2. A method of producing a lubricator of the kind described which is to include a resilient core and a cover in the form of a one-piece circular-closed sleeve of wicking material about the core, and comprising the steps of, affording on opposite sides of the sleeve prior to insertion of such a core therein indicia at points on opposite sides of the sleeve spaced inwardly substantially the same distance from the longitudinal edges of the sleeve, opening one end of said sleeve and inserting therein said resilient core with the end portion of the sleeve projecting outwardly of the related end of said core, bringing together the opposite sides of the sleeve at said projecting end portion thereof so that indicia on the opposite sides of the sleeve at said projecting end portion register, fastening the opposite sides of the sleeve at said projecting end portion thereof while maintaining said indicia in registry, tucking in portions of said sleeve reentrantly at the corners of said projecting end portion to initiate formation of an end flap for the sleeve, and then securing said tucks and flap by fasteners.

3. A method of producing a lubricator of the kind described which is to include a resilient core and a cover in the form of a one-piece circular-closed sleeve of wicking material about the core, and comprising the steps of, affording on opposite sides of the sleeve centering indicia spaced inwardly substantially the same distance from the longitudinal edges of the sleeve, inserting such a core in said sleeve from one end thereof with the end portion of said sleeve projecting outwardly of the related end of said core, aligning the opposite sides of the sleeve at said projecting end thereof so that such centering indicia on the opposite sides of the sleeve at said projecting end are brought into registry, and then fastening together the opposite sides of the sleeve at said projecting end while maintaining the indicia in alignment to afford an end flap for the sleeve.

4. A method of producing a lubricator of the kind described which is to include a pair of resilient cores and a cover in the form of a one-piece circular-closed sleeve of wicking material about the cores, and comprising the steps of, affording on opposite sides of the sleeve marginal indicia spaced inwardly substantially the same distance from the longitudinal edges of the sleeve, additionally affording on both sides of the sleeve medial indicia accurately centered between the first-named indicia, cutting off end portions of said sleeve to provide said sleeve with arcuately shaped ends that will afford rectangular flaps at both ends of the sleeve, providing a tight transverse division across the sleeve at the center thereof to divide the sleeve into two identical sections, inserting into each such section of the sleeve a resilient core with end portions of said sleeve projecting beyond the related outer ends of said cores, aligning the opposite sides of the sleeve at said projecting end portions thereof so that the medial indicia on the opposite sides of said sleeve register one with the other at either end of the sleeve, fastening the opposite sides of the sleeve at both ends thereof with staples centered on the registered medial indicia, tucking in portions of said sleeve reentrantly at the four corners thereof to initiate formation of rectangular flaps at both ends of the sleeve and to bring into final registry the marginal indicia at both ends of the sleeve, and securing said tucks and flaps by staples after such final registry.

5. A method of producing a lubricator of the kind described which is to include a pair of resilient cores and a cover in the form of a one-piece circular-closed sleeve of wicking material about the cores, and comprising the steps of, affording on opposite sides of the sleeve centering indicia spaced inwardly substantially the same distance from the longitudinal edges of the sleeve, providing a tight transverse division across the sleeve at the center line between the ends thereof to divide the sleeve into two identical sections, inserting into each such section a resilient core with end portions of said sleeve projecting beyond the related outer ends of said cores, aligning the opposite sides of the sleeve at said projecting end portions thereof so that the centering indicia on the opposite sides of the sleeve register one with the other at either end of the sleeve, and then fastening together the opposite sides of the sleeve at both ends thereof with fasteners centered on the registered centering indicia to afford end flaps for the cover.

6. A cover for a lubricator of the kind described and including a one-piece circular-closed sleeve of woven wicking material, said sleeve having centering indicia formed thereon in the form of a pair of parallel warp threads of distinctive color on opposite sides of the sleeve and being spaced inwardly substantially the same distance from the longitudinal edges of the sleeve, and other centering indicia on opposite sides of the sleeve in the form of warp threads of distinctive color parallel to the first-named warp threads and being centered between the first-named warp threads on opposite sides of the sleeve, and said sleeve being divided into two identical sections by a transverse fastener fastening together the opposite sides of the sleeve between the ends thereof.

7. A cover according to claim 6 including hook receiving elements at opposite ends of the dividing line for the sleeve defined by said transverse fastener.

8. A method of producing a lubricator of the kind described which is to include a pair of resilient cores and a cover in the form of a one-piece circular-closed sleeve of woven wicking material about the cores, and comprising the steps of, affording on opposite sides of the sleeve in its initial form longitudinally parallel outside marginal indicia in the form of warp threads of distinct color spaced inwardly substantially the same distance from the longitudinal edges of the sleeve, additionally affording on such opposite sides of the sleeve in its initial form medial indicia in the form of warp threads of distinct color accurately centered between and parallel to the first-named indicia, at least some of the distinctively colored warp threads on the one side of the cover being of a color different from the distinctively colored warp threads on the opposite side of the cover, cutting off end portions of said sleeve including said distinctively colored warp threads to provide said sleeve with arcuately shaped ends that will afford rectangular flaps at such ends of the sleeve, dividing the sleeve into two pockets by applying a transverse stitch therein along the transverse center line of the sleeve, affixing grommets to the sleeve at the ends of said transverse stitch, opening said sleeve at said ends thereof and respectively inserting into each of said pockets such a resilient core with the corresponding end portion of said sleeve projecting outwardly of the related end of said core, aligning the opposite sides of the sleeve at said projecting ends so that the related medial indicia on the opposite sides of said sleeve at said projecting ends register with each other, fastening the opposite sides of the sleeve at said projecting ends with a staple centered on the registered medial indicia, tucking in portions of said sleeve reentrantly at the corners thereof at said projecting ends to initiate formation of rectangular flaps and to bring into final registry the outside marginal indicia at said projecting ends of the sleeve, securing said tucks and flaps by staples centered on the finally registered marginal indicia, and then stiffening said flaps.

References Cited in the file of this patent

UNITED STATES PATENTS

| | | |
|---|---|---|
| 91,000 | Devlan | June 8, 1869 |
| 559,691 | Eichhotz | May 5, 1896 |
| 1,123,609 | Spesha | Jan. 5, 1915 |
| 1,950,863 | Raguin | Mar. 13, 1934 |
| 2,259,274 | Stohlman | Oct. 14, 1941 |
| 2,358,125 | Anderson | Sept. 12, 1944 |
| 2,364,575 | Warren | Dec. 5, 1944 |
| 2,713,524 | Hagy | July 19, 1955 |